United States Patent [19]
Smith et al.

[11] 4,121,529
[45] Oct. 24, 1978

[54] BUOYANCY SYSTEMS
[75] Inventors: Egmont S. Smith, McQueeny; Earl N. Doyle; Kenneth E. Baughman, both of Houston, all of Tex.
[73] Assignee: B & B Insulation, Inc., Houston, Tex.
[21] Appl. No.: 725,098
[22] Filed: Sep. 20, 1976
[51] Int. Cl.² ............................................. B63G 8/00
[52] U.S. Cl. ..................................... 114/331; 9/8 R; 114/267; 405/200
[58] Field of Search ............ 9/8 R, 9; 114/245, 16 R, 114/16 E, 267, 234, 50, 54; 61/112, 113, 114

[56] References Cited
U.S. PATENT DOCUMENTS

| | | | |
|---|---|---|---|
| 3,179,962 | 4/1965 | Shear | 9/8 R |
| 3,566,609 | 3/1971 | Smith | 61/112 |
| 3,620,028 | 11/1971 | Wilde | 61/112 |
| 3,727,417 | 4/1973 | Shaw | 61/112 |
| 3,794,965 | 2/1974 | Charske | 114/16 E |
| 3,961,389 | 6/1976 | Dovell | 9/8 R |

FOREIGN PATENT DOCUMENTS 1,407,979 10/1975 United Kingdom ............... 114/16 E Primary Examiner—Barry L. Kelmachter
Assistant Examiner—D. W. Keen
Attorney, Agent, or Firm—Hubbard, Thurman, Turner, Tucker & Glaser

[57] ABSTRACT

A buoyancy system is disclosed for use in controlling the descent and ascent of an object, such as a pipe line being laid offshore. The system includes a plurality of inflatable, collapsible, submersible buoys which may be remotely controlled by air or other inflating mediums. As each of the buoys, and thus the load connected thereto, is lowered or raised in a body of water the pressure inside the buoys is controlled by a valve which is responsive to the hydro-static pressure in the body of water or the volume of the buoy to maintain a relatively small pressure differential between the pressure inside the buoy and the hydro-static pressure at all depths of submersion whether the amount of buoyancy provided by the buoys is to be positive, negative, or neutral. Also disclosed are a plurality of systems utilizing the submersible buoys of this invention for laying pipe line and other objects on or near the sea bottom.

28 Claims, 21 Drawing Figures

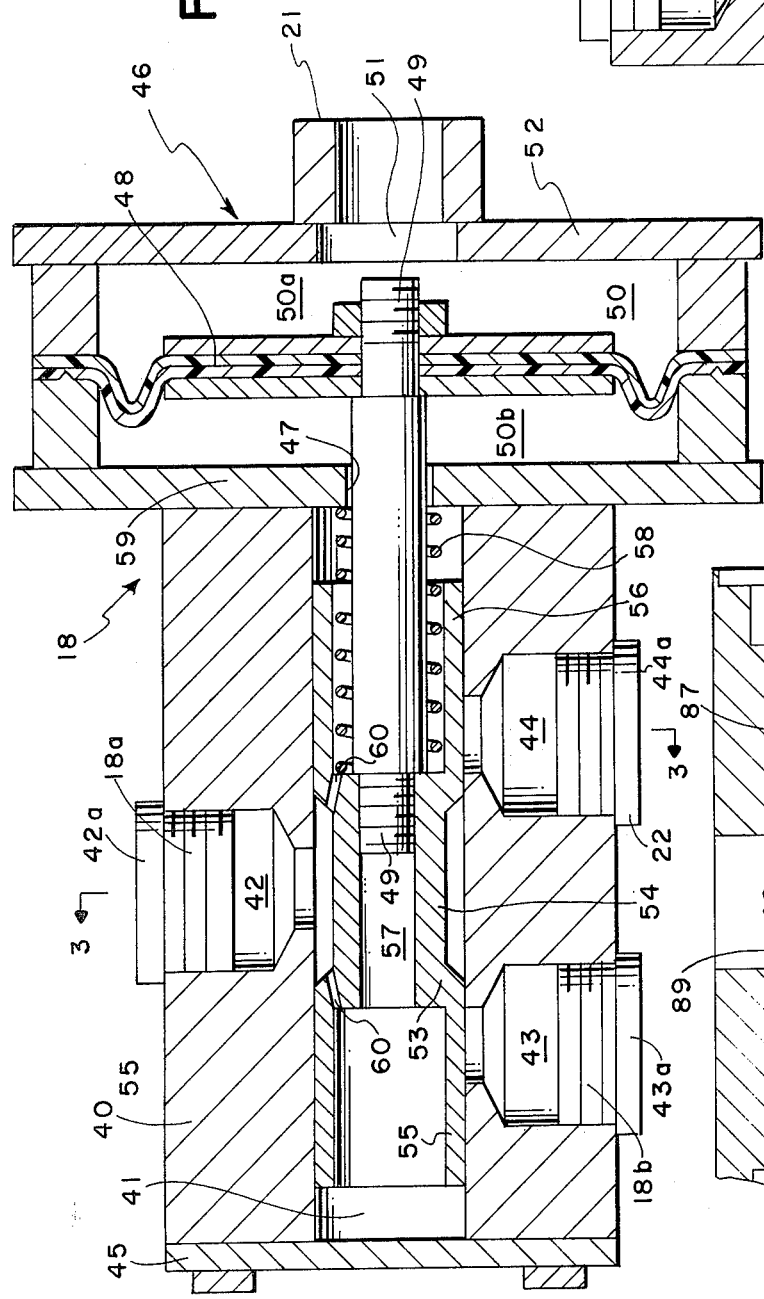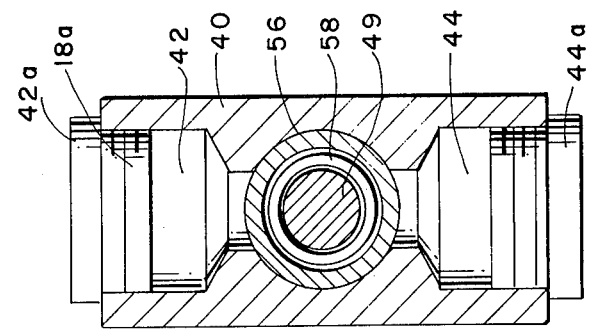

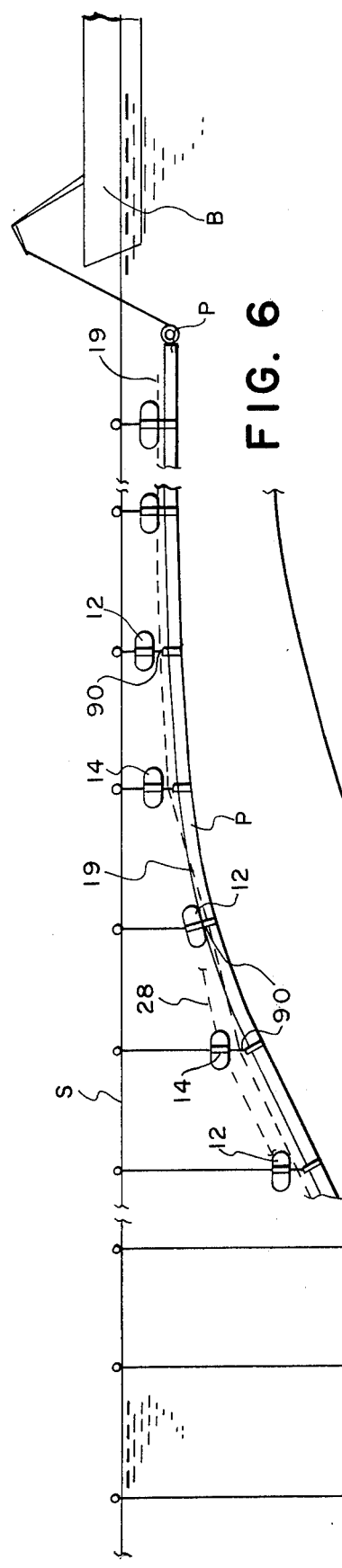
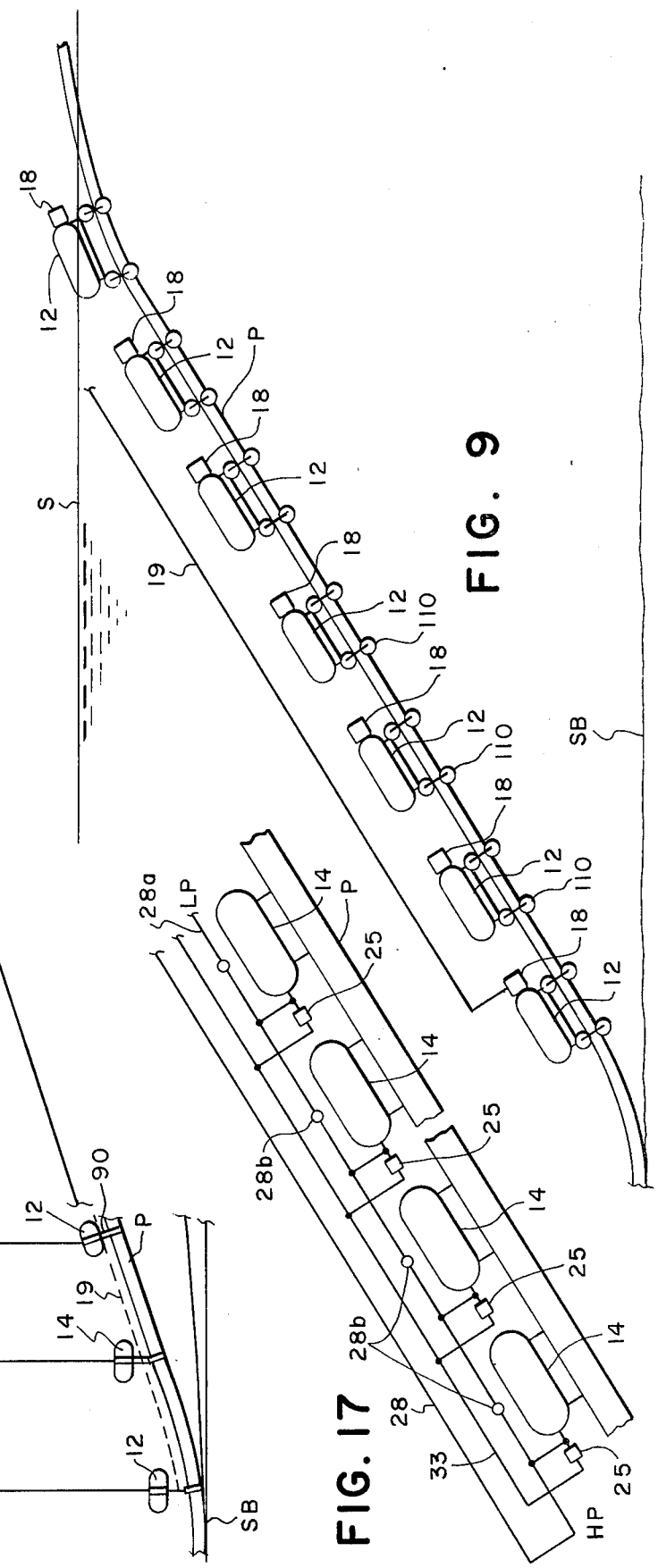

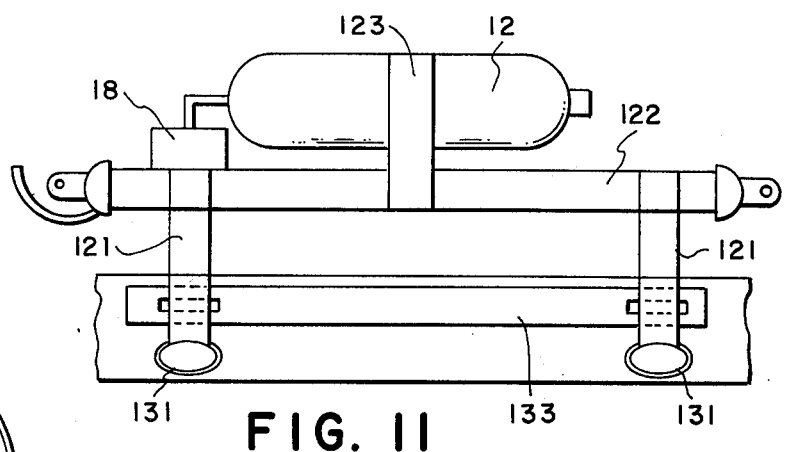
FIG. 11
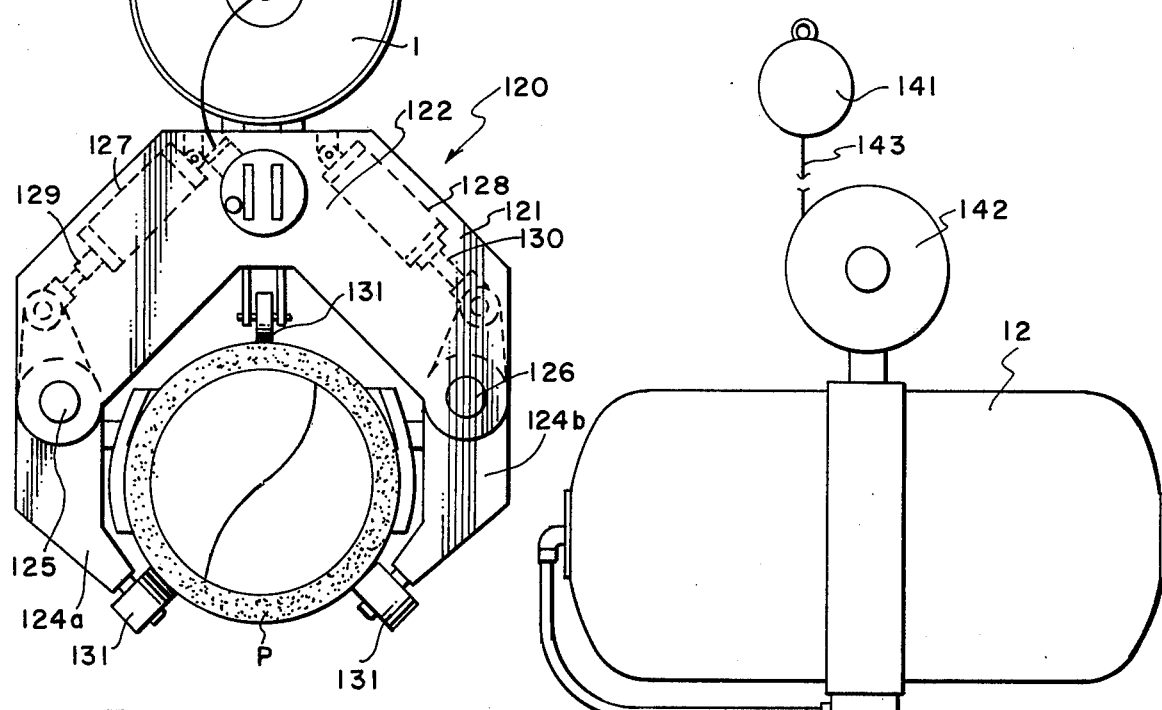
FIG. 10
FIG. 13
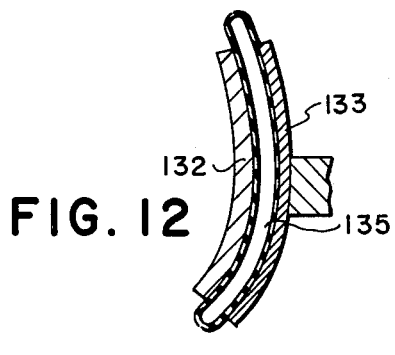
FIG. 12
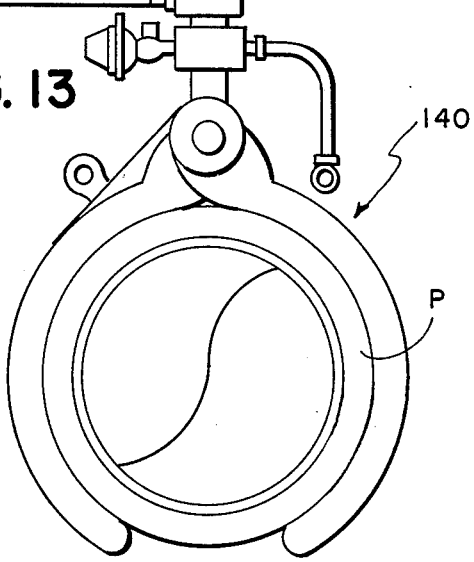

BUOYANCY SYSTEMS

This invention relates to submersible buoys and in one of its aspects to a buoyancy system utilizing a plurality of submersible buoys to control the lowering and raising of objects to and from the sea bottom. Another aspect of this invention relates to offshore pipe line laying systems and systems for placing heavy objects at or near the ocean bottom under control, particularly during the exploration and production of oil and gas from beneath the ocean bottom.

Because of the increasing demands for finding more and more sources of oil and gas, offshore exploration and production has moved steadily into deeper and deeper waters. However, as drilling and production are attempted in deeper waters, the industry faces substantial problems because of the high hydro-static pressures involved and the great distances required for control lines, etc. One difficult and important problem encountered in great depths of water is the handling and laying of pipe lines of great lengths. At the present it is common to employ a large pipe laying barge with large and expensive pipe handling equipment, to lay the pipeline, or to weld large sections of pipe together on shore and tow the welded pipeline to the site where it is to be lowered to the ocean floor, usually under control of a large floating crane.

For use with past pipe laying systems, various forms of buoyancy systems have been suggested by the prior art for controlling the descent of pipe lines being laid on the ocean floor. Examples of such buoyancy systems are illustrated in U.S. Pat. Nos. 3,114,920, 3,181,182, 3,727,417, 3,835,655, 2,900,795, 3,620,028, 3,765,185, 3,136,133, 3,835,656, 3,309,879, 3,803,540 and French Patent No. 2,284,512.

All of these systems, however, in one aspect or another are unsuitable for use in controlling the laying of large pipeline at varying depths. For example, in U.S. Pat. Nos. 3,181,182, 3,114,920 and 3,126,559, large, rigid buoys are disclosed which are not suitable for use in large numbers because of their cost, or suitable for easy transportation from site to site because of their bulk and rigidity. Also, no means is disclosed in these patents for simply and accurately providing substantially precise control, remotely or internally, at all depths of submersion, of the rate of descent or ascent of the load supported by the buoys. Also, because of the inability to practically control large loads at great depths with only a buoy system, in the past the use of very large floating cranes or very large "stringers" and tensioners from which the pipeline is supported, has been necessary.

Many of the problems associated with the prior art buoyancy systems, particularly in conjunction with laying long streams of pipeline, are solved by the use of the present invention which utilizes a plurality of inflatable, collapsible buoys and automatic controls for controlling the pressure differential of the inflating pressure of the buoys and the hydrostatic pressure surrounding the buoys at any depth of submersion during operation. Each of the inflatable buoys may be made of rubber like material, such as natural or synthetic rubbers, polyurethane elastomers, PVC elastomers, etc., reenforced with conventional material such as glass fiber, nylon, polyester and other such reenforcing materials. The buoys are built so that they may be rolled up into a volume which is a very small percentage of their inflated state and therefore can be easily transported from site to site. When totally inflated, they have a maximum volume so as to provide a given displacement of water which is easily calculated. The buoy may be of any conventional shape, such as spherical, cylindrical, or ellipsoidal. The amount of floatation capacity of each buoy is governed by the degree of inflation which controls the volume of water displaced by the buoy. In accordance with this invention, means is provided for automatically controlling the volume or degree of inflation of the buoy to permit the buoy to be varied by any percentage from its maximum buoyancy from a remote location with no connections between the buoy and the remote control location other than the fluid line conducting the inflating medium.

In the preferred embodiment of this invention illustrated in this application, this means is disclosed as a unique valve connected between the fluid line conducting the fluid medium to the buoy and the buoy inlet, and operational under the control of a diaphragm or other apparatus responsive to the hydrostatic pressure about the buoy. In one embodiment of the valve mechanism utilized, a predetermined pressure differential is maintained by the valve structure between the pressure on one side of the valve responsive to the hydrostatic pressure, and pressure on the other side of the valve responsive to the inflating pressure in the buoy, so that at all depths of submersion of the buoy this pressure differential is maintained at a substantially small constant value. This embodiment may be used with a series of buoys, as hereinafter explained, which may be present to a relatively small negative buoyancy when the load is attached to the buoys to provide primary support for the buoys and the load. In another embodiment of the valving structure utilized to control the state of inflation of the buoys of this invention, means is also provided for conducting a pilot pressure to the valve structure to permit the buoyancy of the buoys to be varied under control so that together with the load and the primary buoys they provide a slightly positive buoyancy, a neutral buoyancy, or a slightly negative buoyancy, as desired. Thus, while a load can be largely supported by a plurality of primary support buoys which provide a total slightly negative constant buoyancy on the system, a plurality of secondary buoys can be varied remotely through a small range to thus change the overall buoyancy to control the ascent or descent of the load. As with the valve structure described for control of the primary buoys, an important feature of the present invention is that the valve structure utilized to control the secondary buoys, which permits a variable buoyancy, also functions to prevent the pressure differential between the hydrostatic pressure in the body of water about the buoy and the inflating pressure of the buoy from exceeding a predetermined amount. Thus, by employing the valve apparatus of the present invention with both the primary and secondary buoys utilized in the system described, it is possible to use inflatible buoys which would normally collapse under high hydrostatic pressure at great depths of water, since the buoy only needs to be designed structurally to withstand the pressure differential between the hydrostatic pressure and the internal pressure of the buoy and not to withstand the full load of the hydrostatic pressure.

In accordance with this invention, the buoys utilized in both the primary support system and the secondary support system are preferably made of light, inflatable material and are easily portable.

As an example of the utilization of the buoyancy systems of the present invention in connection with the laying of an offshore pipeline, if the pipeline is towed out to sea the buoyancy system can control the pipe at any given depth below the surface, or at any given distance from the sea floor, or can control the pipe so as to actually be in touch with the sea floor, with any given amount of negative buoyancy, so as to be less subject to currents, yet with only a percentage of its total weight in contact with the sea floor. This system allows for surfacing of the pipe when necessary, or even surfacing one end only for tie-ins, etc. The buoyancy system can be disengaged at any given time from the pipe, and totally controlled from a surface vessel.

For lay-barge operations with the present invention, the pipe can be cradled from the lay barge at any given angle of repose, without the use of stingers or tensioners. Automatic braking systems provide alternate release and holding of the buoyancy system as the pipe is laid, with no damage to concrete or other coating on the pipe. As in the tow-out operations, the total buoyancy system can be released from the pipe at any given time, and controlled from the surface vessel.

The buoyancy of the present invention system has no depth limitations and it is entirely feasible to handle pipe in water of 10,000 ft. depth, by either of the above types of laying operations.

The depth of water to which this system may be used is controlled entirely by the surface-supplied air or gas pressure, which only need be some 0-5 PSI greater than hydrostatic pressure at that depth. The rate of descent is controlled by the flow quantity (CFM) of air or other gas supplied, since the system cannot be lowered at a rate greater than the CFM capacity.

For surfacing, relief valves are provided for bleeding off excess pressure as the system rises to the surface. The entire line of any given length may be held static at any given depth indefinitely. It may be held in a level position, or one end may be lower than the other, to follow bottom curvatures, or one end may upon signal be raised to the surface for tie-ins, etc.

Any signal to change position must of course come from the surface vessel, but once this signal is sent, all other changes in the buoyancy system are entirely automatic, controlled by the valving system on each individual buoy.

All controls are air or other gas and there are no electrical systems of any kind. In some types of operations, for instance lay-barge operations, there will be a single air line to the surface vessel. In other types of operations, as in tow-out operations, there will be two air lines to the surface vessel. Generally, it will not be necessary to have more than three air lines to the surface.

During operations at sea, the entire system with its load of pipe can be disengaged from by the surface vessel, and later be picked up at will. The ends of the air lines may be disconnected from the compressor, and left attached to a marker buoy for later pickup. This is a very desirable feature for work in stormy seas, where conditions may require that tugs or other vessels disengage from their loads until conditions improve. The pipe and buoyancy system can be left indefinitely on the ocean floor for subsequent pickup.

The entire system can be relatively inexpensive since the largest and most expensive part of the equipment is generally compressor equipment. The buoys themselves can be rolled up and stored or transported easily, in very little space, along with hoses and valving equipment. Auxiliary equipment, such as clamps to pipe for tow-out operations, cradlying equipment for lay-barge operations, etc. are so constructed as to fit many sizes of pipe, with only small on-site adjustments. All this equipment can be designed as to be minimal in bulk and weight.

Also, with the present invention underwater camera equipment, and many other types of equipment can be handled more safely and more economically than by present methods, with far more precise control.

In the drawings, wherein like reference numerals are used throughout to designate like parts, and wherein preferred embodiments of the invention are illustrated:

FIG. 2 is a cross sectional view of one form of a valving apparatus utilized to maintain a constant pressure differential in the primary buoys utilized in the buoyancy system of this invention;

FIG. 3 is a sectional view of the valve apparatus of FIG. 1 taken at 3—3 in FIG. 2;

FIG. 5 is a sectional view of another form of the valving apparatus which may be utilized with the apparatus of FIG. 2 or FIG. 4;

FIG. 6 illustrates a method of pulling out a pipeline to be laid at an offshore sea bottom utilizing the buoyancy system of the present invention;

FIG. 9 illustrates utilization of the buoyancy system of the present invention to control the descent of a pipeline in which a braking system is used to control the position of each of the buoys on the pipeline during descent.

FIG. 10 illustrates a view in elevation taken from the end of the braking mechanism and cradlying apparatus utilized with the system of FIG. 9;

FIG. 11 is a side view in elevation of the apparatus of FIG. 10;

FIG. 12 is a cross sectional view in elevation of the braking mechanism as utilized with the apparatus of FIG. 10;

FIG. 13 is a view in elevation illustrating one form of apparatus for realeasably connecting a buoyancy member to a pipeline for releasably supporting pipeline at any desired depth of submergence;

FIG. 17 is a schematic view illustrating the use of the buoyancy system of the present invention to control the angle of submergence of a pipeline;

Figure 1:
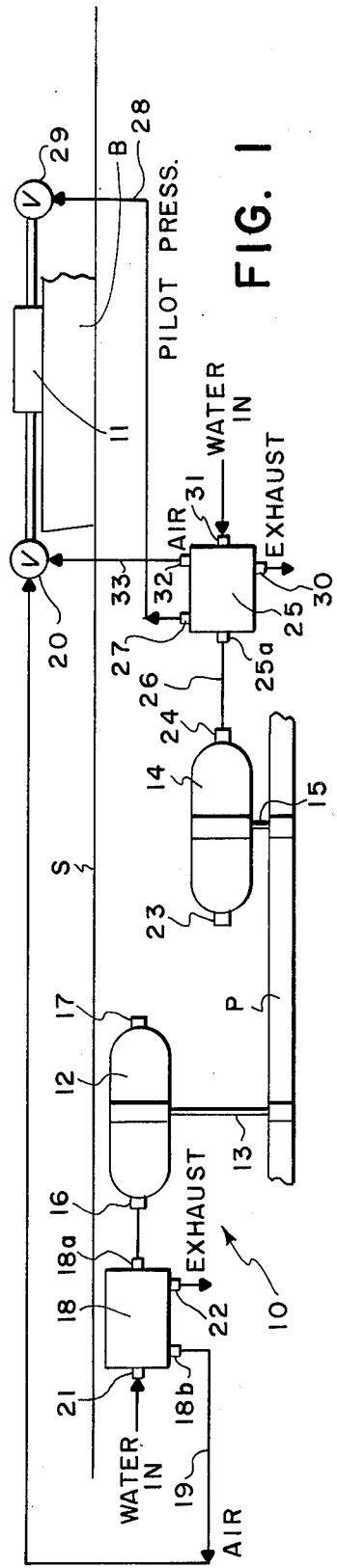
FIG. 1 is a schematic view of a buoyancy system employing the present invention to support a pipeline at a desired depth of submergence in a body of water.

Referring now to the drawings, in FIG. 1 the buoyancy system 10 of this invention is illustrated as being utilized to support a pipeline P below the surface S of a body of water. Buoyancy system 10 includes a source of pressurized fluid 11, such as an air compressor (not shown) mounted on work barge B for providing inflating pressures, a primary buoy 12 made of inflatable material and connected to pipeline P through a hose 13, and a secondary buoy 14 also made of inflatable material connected to pipeline P through a hose or other suitable connecting means 15. Generally the system will include a plurality of primary and secondary buoys, as needed, to control a relatively long length of pipeline at different depths of submergence. Primary buoy 12 includes an inlet 16 for receipt of an inflating medium and a relief valve 17 for relieving excessive pressures from the buoy to prevent rupture, particularly when the buoy rises to the surface. Inlet 16 is connected to an outlet 18a of a valving apparatus 18 which is hereinafter described in detail, and valving apparatus 18 includes an inflating medium inlet 18b connected through a fluid conduit 19 and a control valve 20 to source 11 as illustrated in FIG. 1. Valving apparatus 18 also includes an inlet 21 which is open to the surrounding hydrostatic pressure about the buoy 12, and an exhaust outlet 22 for exhausting inflating medium from buoy 12.

Secondary buoy 14 is similar to primary buoy 12 and includes a relief valve 23 and inlet 24 for receipt of an inflating medium from an outlet 25a of a valving apparatus 25 connected thereto through a flow conduit 26. Valving apparatus 25 is similar to valving apparatus 18, however, as hereinafter described, it includes an inlet 27 connected to receive a pilot pressure through a conduit 28 and a control valve 29 from the source of pressurized gas 11. Valving apparatus 25 also includes an exhaust outlet 30 and an inlet 31 exposed to the hydrostatic pressure about secondary buoy 14. The air supply for inflating the secondary buoy 14 is obtained through an inflating medium inlet 32 connected through a flow conduit 33 to valve 20.

During operation of buoyancy system 10 illustrated in FIG. 1, pipeline P, which may be of great length and have any number of combinations of primary and secondary buoys connected to it in order to control its descent and ascent in a body of water, is preferably kept at a slightly negative buoyancy tending to permit the pipeline to descend in the body of water by addition only of the primary buoys. Then, by further addition of the secondary buoys to the pipeline, their buoyancy can be varied under control through a relatively small range to permit the buoyancy of the system to go from a slightly negative buoyancy as provided by the primary buoys only to a slightly positive buoyancy to cause ascent of the pipeline to a predetermined depth. Also, the buoyancy of the secondary buoys can be adjusted to provide neutral buoyancy at any desired depth of submergence for the pipeline so that one end of the pipeline can be at a deeper depth in the body of water than the other end and the whole pipeline can be maintained under control throughout its length at any of the depths between.

In the system of FIG. 1, it is possible to replace the primary buoys with buoys having a fixed buoyancy that provide a slightly negative buoyancy when the weight of the pipeline is attached thereto and the pipeline is submerged at a desired depth. However, for the purpose of providing better control, and permitting the point at which the buoyancy becomes slightly negative in the primary buoys to be varied, the apparatus that is described for the primary buoys in FIG. 1 is preferred.

Referring now to FIGS. 2 and 3, valving apparatus 18 for controlling the primary buoy 12 is illustrated as including a main body or housing 40, which in turn includes a central longitudinal bore 41 through the length thereof and a plurality of transverse bores 42, 43 and 44 extending from central bore 41 to the exterior of housing 40. As illustrated in FIG. 2, bore 42 receives a threaded coupling or fitting 42a to form outlet 18a, bore 43 receives a threaded coupling or fitting 43a to form inlet 18b, and bore 44 receives a threaded coupling or fitting 44a to form exhaust outlet 22. Although not required, it is preferred for ease of manufacture that each of the bores 41, 42, 43 and 44, be circular.

As illustrated in FIG. 2, one end of bore 41 is closed by a plate 45 mounted on one end of housing 40, and second housing 46 is mounted on the opposite end of housing 40 and includes an opening 47 in communication with bore 41. Housing 46 includes a flexible diaphragm 48 mounted on a threaded rod 49 and rod 49 extends through opening 47 and into bore 41 to function as a control rod for a valve member as hereinafter described. Membrane 48 is preferably made of flexible material mounted in a center chamber 50, and a diaphragm 48 divides chamber 50 into a first area 50a that can be exposed to the hydrostatic pressure about the primary buoy to which the valve apparatus 18 is connected, and a chamber 50b which is exposed to the internal pressure of the buoy. An opening 51 is provided in wall 52 of housing 46 separating the chamber 50a from the hydrostatic pressure, and outlet 21 is mounted by an opening 51 as illustrated in FIG. 2. Thus, fluid pressure in chamber 50a, which is at the hydrostatic pressure outside housing 46, acts against diaphragm 48 and tends to urge diaphragm 48 and threaded rod 49 away from opening 51.

A slidable valve member 53 is mounted in bore 41 and includes a center portion 54 of a diameter less than the internal diameter of bore 41, and enlarged end portions 55 and 56 of a diameter slightly less than the diameter of bore 41 to permit the valve 53 to slide in bore 41. Each of end portions are hollowed out in their interior. For purposes of illustration of this invention it is assumed that all of the parts described in valve member 53 are circular in cross section and bore 41 is also cylindrical.

The center portion 54 of member 53 includes an internal bore 57 which is threaded to receive threaded rod 49 which also passes through the interior of outer portion 56 of the valve member 53. Thus, as threaded rod 49 moves in response to the movement of diaphragm 48, valve member 53 likewise is caused to move. Also, a coil spring 58 is mounted about threaded rod 49 between center portion 54 of valve member 53 and the wall 59 of housing 46 which is mounted on housing 40. Spring 58 opposes the movement of threaded rod 49 towards opening 51 and biased valve member 53 in the opposite direction.

As illustrated in FIG. 2 when valve 53 is centered in bore 41, bores 43 and 44 are closed by end portions 55 and 56 respectively of the valve member while bore 42 is in fluid communication with bore 41 and by way of openings 60 in the wall of valve member 53. Openings 60 communicate between the portion of bore 41 about central portion 54 and the interior of each end of portions 55 and 56 of the valve member.

With the structure described in FIG. 2, it is intended that a slightly negative buoyancy be provided by the combination of the buoy connected to the valve and the load attached to the buoy when valve 53 is in the position illustrated in FIG. 2. In this position the pressure in outlet 42 and in bore 41, and thus the pressure on the side 50b of diaphragm 48 opposite from inlet 51 will be more than the pressure in chamber 50a which is exposed to hydrostatic pressure. However, it is preferred that this differential only be a few pounds, i.e., preferably less than five PSI and this differential is maintained by selecting a spring 58 of the proper size.

In the apparatus illustrated in FIG. 2, either the spring 58, or the hydrostatic pressure in chamber 50a if the buoy is in deep enough water, will cause valve mechanism 54 to move towards the left in FIG. 2 to open inlet 43 and provide for the flow of air or other inflating medium into a primary buoy through outlet 42. Thus, as the buoy is inflated and the pressure in outlet 42, bore 41 and chamber 50b rises to the point that it is equal to the hydrostatic pressure plus the tension in spring 58, valve member 53 will then move to the right in FIG. 2 to close opening 43. There may be some hysteresis in this operation which will cause cycling of the valve member until the pressure is stablized. Because of the force of spring 58 the pressure added to the buoy will always be slightly more than the hydrostatic pressure so that any given depth of submergence a slightly negative buoyancy will be provided by the valve member. Thus, when a load is connected to the primary buoy, causing it to be drawn down into the water, valve apparatus 18 responds to the buoy to add air to the system supporting the load to offset change in hydrostatic pressure.

Figure 4:
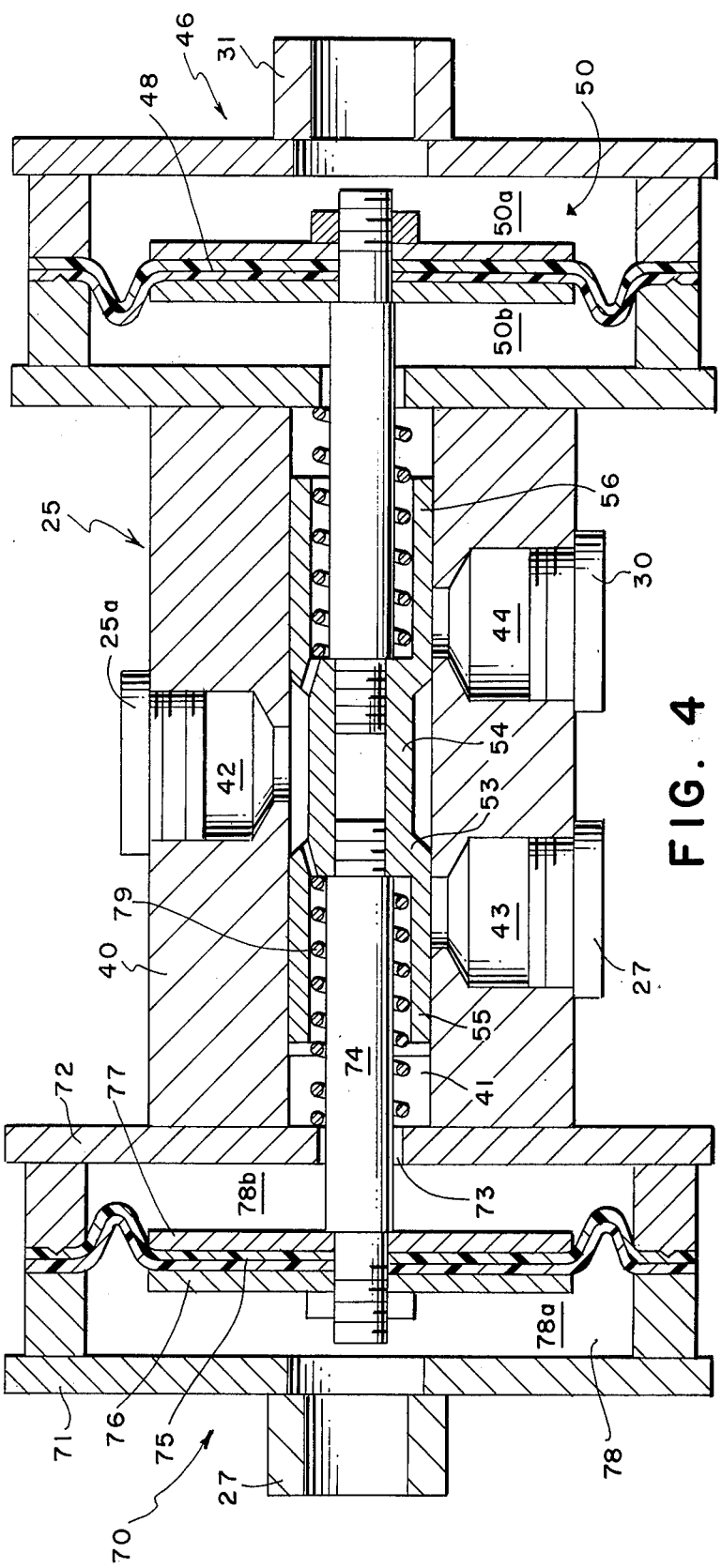
FIG. 4 is a cross sectional view of another form of a valving apparatus utilized with this invention for maintaining a predetermined pressure differential between the inflating pressure of a secondary buoy and the hydrostatic pressure about the buoy.

Referring now to FIG. 4 the valve apparatus 25 for controlling the secondary buoys utilized in the present invention is illustrated. In FIG. 4 like reference numerals are used throughout to designate those parts which are identical to the structure previously described with respect to FIG. 2, it being understood that the basic difference between the valving apparatus of FIG. 4 and that of FIG. 2 is that a second diaphragm is added to permit control of the position of the valve member by an external fluid pressure. As illustrated in FIG. 4, in place of plate 45 in the FIG. 2 embodiment, a housing 70 is provided which includes an outer wall 71 in which an inlet 27 for receipt of a pilot pressure is provided, and an inner wall 72 includes an opening 73 in communication with central bore 41 in housing 40 and through which a second threaded rod 74 passes. A diaphragm 75 is mounted on threaded rod 74 between plates 76 and 77, in housing 70 and in a chamber 78 formed therein. Diaphragm 75 divides chamber 78 into a sub-chamber 78a exposed the pressure in inlet 27 (and thus the pilot pressure) and a sub-chamber 78b exposed to the pressure in central bore 41 in the same manner as described with respect to chamber 50 in FIG. 2.

Also included in the FIG. 4 apparatus is a second spring 79 which is provided between portion 55 of valve member 53 and wall 72 so that when the pressure on the chamber 78 side of the diaphragm 75 and on chamber 50a side of diaphragm 48 are equal, valve member 53 is centered as illustrated in FIG. 4, and is automatically self-centering whenever these pressures are equal.

Thus, with the apparatus described in FIG. 4, the pilot pressure through inlet 27 can be utilized to regulate the position of the valve 53 with respect to bores 42, 43 and 44, in addition to the hydrostatic pressure. Thus, if the hydrostatic pressure at a known depth is determined the pressure at inlet 27 can be set to provide the necessary change in the pressure of the inflating medium in the secondary buoy to provide ascent or descent of the buoy to the desired depth of submergence.

FIG. 5 illustrates an alternate form of the valve mechanism and valve body which may be utilized in the FIG. 2 and FIG. 4 apparatus described. It is essentially the same structure as described and includes a valve member 80 slidably mounted in a central bore 81 of housing 40 to control the flow of air between inlet 43 and outlet 42, and outlet 42 and outlet 44. As illustrated in FIG. 5 valve member 80 includes end portions 82 and 83 of a diameter slightly smaller than the diameter of outlet bore 81, and a central portion 84 of reduced diameter corresponding to central portion 54 of valve member 53 in FIG. 2. However, valve member 80 includes tapered shoulders 85 between each of end portions 82 and 83 and central portion 84 and two circular grooves 86 are provided in housing 40, transverse to central bore 81 with each groove 86 having tapered side walls 87 and being in communication with one of inlet 43 or outlet 44. With this arrangement as valve member 80 moves from a position closing off communication between outlets 42 and 44, thus moving to the right in FIG. 5, flow between the outlets builds up gradually as the lower edge 88 of tapered shoulder 85 passes over the opening in outlet 44, until full flow is established. Similarly, when the valve member moves to the left flow from inlet 43 to outlet 42 is first picked up along edge 89 of tapered shoulder 85 of end portion 82 and increases as the valve member continues to move to the left in FIG. 5. By this arrangement abrupt and sudden flow changes are avoided and hysteresis is minimized in the operation of the valve. Also, with the angled and tapered shoulders 85, the distance of movement of valve member 80 in either direction from center to cause some sort of change in pressure in the buoy is reduced and the range of control over the operation of the valve is increased.

Referring now to FIG. 6 a method is illustrated which utilizes the buoyancy system of the present invention to pull or lay a pipeline P in a body of water which may be assembled in sections on shore and towed from shore outwardly in the body of water to a location to be joined together. The pipeline is towed out by a barge B, only a portion of which is shown in FIG. 6. For purposes of illustration the system of FIG. 6 includes a plurality of primary buoys 12 and a plurality of secondary buoys 14 connected along the length of pipeline P by a releasable coupling 90, such as shown in detail in FIG. 13. Thus, as the pipeline P is pulled in the water by barge B it is supported by the buoys until it reaches and is laid along the bottom of the sea (indicated by the letters SB) at which time the buoys at the sea bottom can be remotely released from the pipeline the retrieved and returned to the barge for continued use during the sequence of operations or during a subsequent operation.

For example, by use of the system of FIG. 6, one mile or greater lengths of pipeline sections may be towed great distances on the surface of a body of water, or at any desired level below the surface of a body of water to an offshore location where these sections can be joined together to make up an entire pipeline. The pipeline sections, with their protective coatings, weight coatings, etc. can be calculated as to their negative buoyancy in sea water. The proper number of primary buoys can be attached to still retain a slightly negative buoyancy on the pipeline section, and the required number of secondary buoys to give a slightly positive buoyancy to the section when fully inflated can be attached to the pipeline sections at spaced intervals between the primary buoys. The primary and secondary buoys may be connected to the common high-pressure line 19 which functions as a primary air line. The pressure in this line will be maintained at a slightly higher value than the hydrostatic pressures at depths to which the line will be ultimately subjected. The secondary or pilot pressure air line 28 is also run from barge B and is attached only to the control valving 25 of the secondary buoys. The pressure in line 28 will vary, according to the depths desired by the personnel laying the line, or towing the line. The air pressure in line 28 is generally pre-set at the surface control stations for the depth at which the pipeline section is to be held, and if it should be desired to bring the pipeline section P to the surface S, all or a substantial part of the pressure can be relieved from line 28. However, for example, if it should be desired to lower pipeline section P to 100 feet of depth, and hold it at this depth for extended periods of time, such as for two-out, then the pressure of the pilot pressure line 28 would be set at approximately 46.5 PSI. When it is ultimately desired to lower the pipeline to the bottom, then the pressure in pilot pressure line 28 would be increased in increments, allowing the pipeline to descend at a given, controlled rate until it has settled on the ocean floor. Then at any given time, controls at the surface (not shown) would allow the operator to actuate mechanism 90 to release any part or all of the flotation buoys, together with the air lines, and other auxiliary equipment, and bring them to the surface where they can be recovered, deflated, and rolled up into a very small space for returning to shore to be reused. The control valving allows the buoys to return to the surface from any depth, releasing their pressures as they rise so as to maintain, for example, a maximum 5 PSI differential pressure inside the buoy at any given point in the ascent.

Thus, with the system illustrated in FIG. 6 pipeline sections as long as a mile or more in length can be assembled on shore and then towed out to sea under control for joining.

Figure 7:
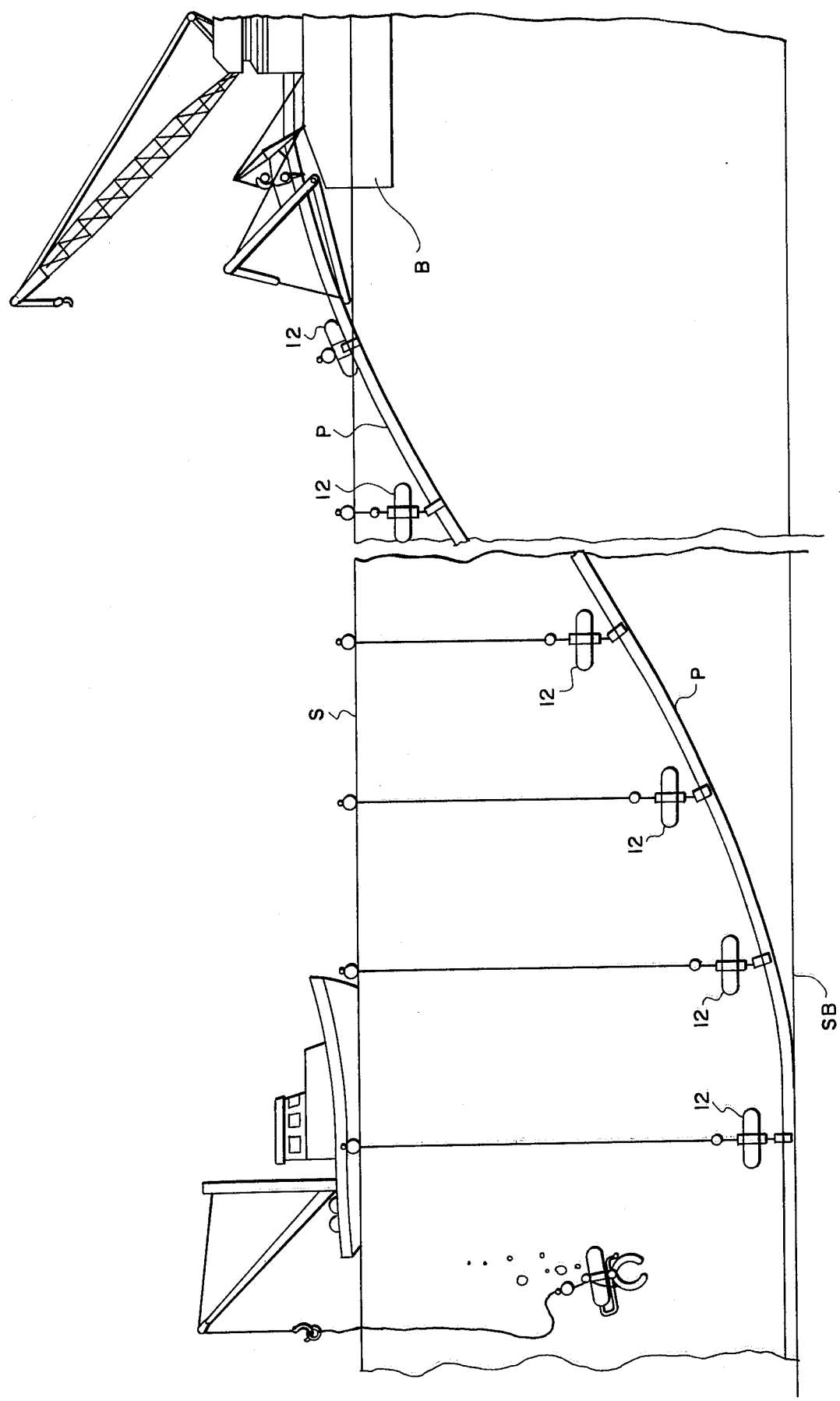
FIG. 7 illustrates a method of utilizing the present invention to assist in the laying of an offshore pipeline from a lay barge.

Referring now to FIG. 7 a system is illustrated in which a pipeline P is laid at sea from a lay barge B. Pipelines up to several hundred miles long are many times laid from lay barges and pipe of any size may be handled. This is generally a continuous operation, with crews working 24 hours per day. The method generally used today employs a large barge equipped with multiple anchors ahead and to the sides of the barge. Anchor winches position the barge, and pull it ahead as work progresses. Work boats pick up the anchors and move them as required. In shallow water, the laying of the pipe off the rear of the barge presents no problems, however, as the water becomes deeper, holding the pipe at an angle at which it and its coating materials will not be damaged becomes a problem. A "stinger" is generally angled off the rear of the barge to support some of the load of the pipe, and tensioners in multiples are arranged so as to hold a part of the load. But as water becomes deeper and deeper, such methods as those offered by the present invention are a necessity. In use of the system of this application, the required amount of floatation is calculated, and a plurality of primary buoys 12 are attached to the pipe to provide the desired angle of descent of the pipe to the sea bottom, whatever be the depth. In this type of application, since all the buoys are primary buoys, the source of inflating air can be provided by only a single, high-pressure air line 19. Since some of these buoys will be at the surface at the same time others will be at all depths between the surface and the ocean floor, obviously each buoy or set of buoys will require different pressures in order to withstand the hydrostatic pressures and still retain a plus pressure differential inside each buoy at all times. For instance, if the ocean floor is 1,000 feet from the surface, and a 30° angle is required on the pipe as it is being lowered in, some 18 buoyancy stations might be required 100 feet apart, or perhaps 36 stations 50 feet apart. Each buoyancy station would require increasingly higher pressures at greater depths, yet all must be controlled from a single air pressure source at a pressure which will offset the hydrostatic pressures at 1,000 feet, or 434 PSI plus the slight differential inside the buoys. The valving system 18 of this invention permits each buoyancy station to receive its required air pressure from a single 500 PSI air supply completely automatically, and merely maintain pressure inside equal to surrounding hydrostatic pressure, plus a 1-5 PSI differential so as to stay totally inflated and maintain its maximum buoyancy. In the method illustrated in FIG. 7, buoys 12 are continuously attached to the pipe as it is being laid, and as the pipe reaches the ocean floor, the buoys are automatically detached, returning to the surface to be re-used again.

Figure 8:
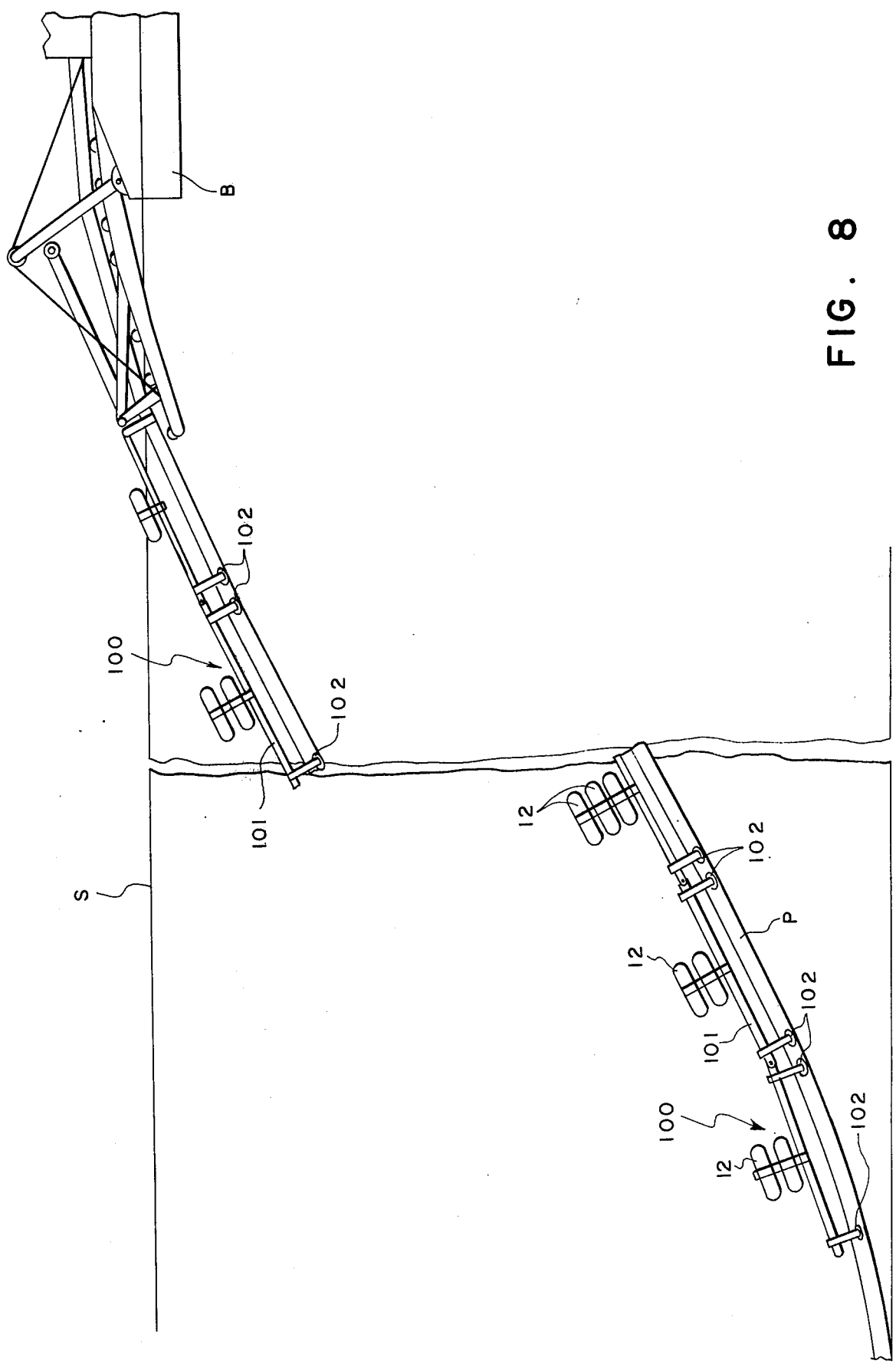
FIG. 8 illustrates a method of utilizing the buoyancy system of the present invention to assist in the laying of the pipeline from a lay barge and cradle assembly extending from the lay barge.

Referring now to FIG. 8, another method of utilizing the buoyancy system of this invention for laying a pipeline P offshore is illustrated.

By this method, pipeline P is cradled to the bottom by a plurality of cradle assemblies 100 which include a plurality of primary buoys 12 connected to an elongated, rigid stiffener 101 which includes a plurality of rollers 102 through which pipeline P may pass as it is being lowered. The cradle assemblies 100 are connected end to end and extend downwardly from a barge B. By this method the same buoys remain on the pipe for an entire pipeline job, although buoys would be added for deeper water, and removed in shallower water. The pipe would pass through rollers in the cradles of each buoyancy station continuously. In place of rigid stiffener 101, another embodiment of the method and system of FIG. 8 employs two rearwardly placed anchors (not shown) to hold the buoyancy stations in their respective locations, with each anchor alternately being moved by an auxiliary work boat. In this case, the stiffeners may or may not be used, strictly according to the particular application, since the force will be held from the ocean floor, as opposed to the surface. Still another embodiment of the FIG. 8 system and method utilizes a braking system associated with the buoyancy stations, to remotely control the position of each buoyancy station in its location along the pipe. Here again, the stiffeners may or may not be used, according to other specific conditions. Several types of braking systems can be utilized, including air actuated, air-over-hydraulic actuated, straight hydraulic, and electromagnetic brakes. All are designed so as not to damage protective and/or weight coatings on the pipe. Braking systems will not have to be necessarily placed at each floatation station, but rather at each 250-500 feet along the pipe, depending upon the angle of the pipe. The less the angle, the lesser amount of holding power will be necessary; and conversely, the greater the angle, the greater amount of holding power required. Since the lay barge is almost constantly in forward motion, the floatation system will also be in almost constant motion along the pipe. Braking action can be automatically coordinated with the forward motion of the lay barge.

FIG. 9 illustrates a system similar to that shown in FIG. 8, but without the stringer connecting the buoys 12, which are supplied with inflating pressure from conduit 19 and through control valve 18. A combination roller and braking apparatus 110 connected to each of buoys 12 stradles pipeline P and can selectively, by applying a braking force, ride the pipe, or by releasing the braking force, permit the pipe to pass through the apparatus. Thus, as the pipeline is lowered each of the buoys 12 can be lowered by the pipeline to a preselected depth and desired spacing along the pipeline when this depth is reached the braking forces can be released to permit the pipeline to be supported at a desired angle in the water under guidance and support from the buoys. If the pipeline is raised in the water, the buoys at the top can be removed and, conversely, if lowered, buoys can be added to the pipeline near the water's surface. Of course, because of the control provided by valves 18 the inflating pressure in buoys 12 will be maintained at the appropriate value 0-5 PSI greater than the hydrostatic pressure at any depth of submergence and throughout descent and ascent.

Referring now to FIGS. 10, 11 and 12, one form of a braking apparatus 120 which may be utilized with the buoyancy systems illustrated in FIGS. 8 and 9 is shown. The braking apparatus illustrated also provides for releasable engagement with the pipeline so that the whole apparatus, including the buoy or buoys connected to it, may be brought to the surface upon command. Also, the apparatus illustrated includes a plurality of rollers and when the braking force is released it permits the pipeline to pass through to the apparatus by rolling on the rollers. For this purpose apparatus 120 is provided which includes two spaced apart, generally downwardly extending U shaped frame members 121 connected to opposite ends of an elongated stringer 122 to which one or more buoys 12 or 14 are connected by a strap or other connecting member 123. Frames 121 include a main upper body portion 122 and depending, pivoted arm portions 124a and 124b respectively which are connected at pivot points 125 and 126 to upper body portion 122 as illustrated in FIG. 10. As also illustrated in FIG. 10 a pair of fluid operated cylinders 127 and 128 mounted on opposite sides of main body portion 122 are connected through their respective piston rods 129 and 130 to arms 124a and 124b between the position illustrated in FIG. 10 where apparatus 121 stradles pipe P so that the pipe may roll on a plurality of rollers 131 mounted by frame 121, and a position where arms 124a and 124b open away from each other to permit apparatus 120 to be lifted from pipeline P. Cylinders 127 and 128 may be pneumatically operated or hydraulically operated from a lay barge so that when pipe P reaches the bottom of a body of water apparatus 120 can be released and brought back to the surface.

As also illustrated in FIG. 10, apparatus 120 includes a braking mechanism, illustrated in detail in FIG. 12, which includes two elongated brake shoes 132, each mounted on one of arms 124a and 124b and extending towards the other and towards pipe P. As illustrated in FIG. 11 it is preferred that the brake shoes extend between spaced apart body portions 121. The braking mechanism also includes a back-up plate 133 connected to each of arms 124a and 124b and elongated air bags 135 connected to each back-up plate and to which each of the brake shoes 132 are connected. Thus, by the introduction of air into air bags 135 brake shoes 132 can be forced into engagement with the surface of pipe P as required to apply braking forces between apparatus 120 and the pipe P.

Figure 14:
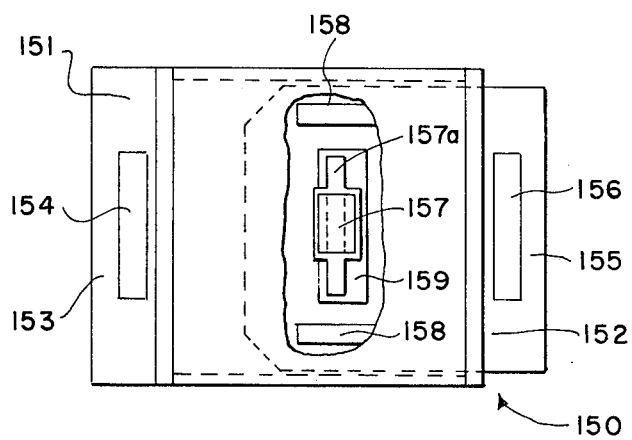
FIG. 14 is a top view in elevation of the releasable buckle for releasably supporting a pipeline at any desired depth of submergence.
Figure 15:
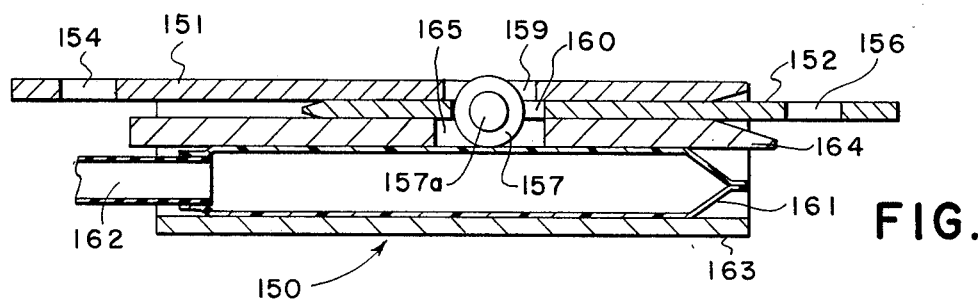
FIG. 15 is a cross sectional view taken along lines 15—15 in FIG. 14 illustrating the buckle of FIG. 14 in a closed position.
Figure 16:
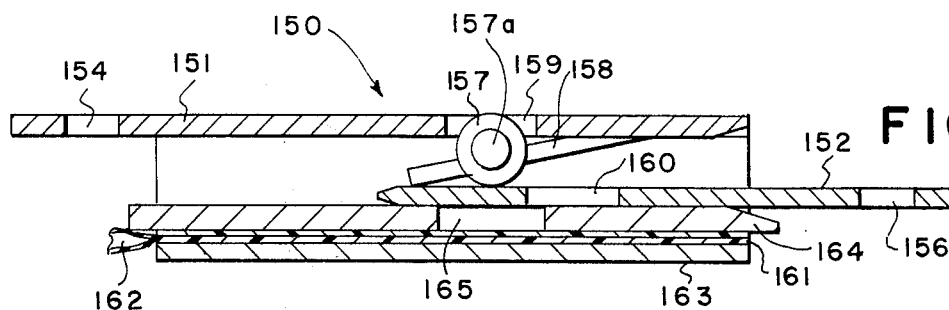
FIG. 16 is a view similar to FIG. 15 but illustrating the buckle of FIG. 14 in an open position.

Referring now to FIG. 13, apparatus 140 is illustrated for providing releasable engagement of a buoy (either primary or secondary) to a pipeline P. Also, a marker buoy 141 as illustrated as being connected to a spool 142 by a cable 143 and marker buoy 141 can be caused to remain at the surface of the water to permit the location of an underwater buoy to be easily determined, such as when pipeline is left at an offshore position during heavy seas or other reasons. Apparatus 140 is deisgned to be released and picked up by a work boat through a cable, hook and winch on the work boat, and without diver assist. However, as illustrated in FIGS. 14 through 16 a remotely releasable buckle 150 can be provided for use with the present invention, and the buckle can be actuated from the remote source to cause a buoy or other object to be released from a pipeline or other underwater object. For example, in the system illustrated in FIG. 6 a releasable buckle can be placed between each of the buoys and the pipeline and released upon command when that portion of the pipeline on which a particular buoy is connected reaches the sea bottom.

As illustrated in FIGS. 14, 15 and 16, buckle 150 includes two flat plates 151 and 152 with plate 151 forming the top of the buckle in the orientation of the buckle illustrated in the drawings. Plate 152 is mounted below plate 151 and in abuttment therewith, but in a manner so that it may slide away from plate 151. Plate 151 includes a portion 153 extending beyond the main portion of the buckle, and outwardly extending portion 153 includes a slotted opening 154 through which a strap or other mechanism for securing the buckle to either the buoy or the pipeline may be passed. Similarly plate 152 includes an outwardly extending portion 155 extending beyond the main body of the buckle and outwardly extending portion 155 includes a slotted opening 156 through which a strap or other connecting means may be passed for connecting the buckle to either the buoy or a pipeline, i.e., to the member which is not connected to the buckle by the strap which is passed through opening 154. Thus, with the arrangement as shown in plates 151 and 152 are pulled apart and disengaged from each other, then the buoy and the pipeline connected thereto would also be disengaged from each other.

To permit plates 151 and 152 to be selectively disengaged from each other, means is provided which includes a roller 157 which is mounted by a shaft 157a in a slotted opening 159 provided in plate 151. Also, a slotted opening 60 is provided in plate 152 so that roller 157 may also be received in opening 160 as illustrated in FIG. 15. Leaf springs 158 are also mounted on plate 151 and normally urge plate 152 away from plate 151.

Thus, with the arrangement as shown, when plates 151 and 152 are engaged together in the relationship shown in FIG. 15, any forces tending to pull them apart causes plate 152 to butt against roller 157 in opening 160, thus preventing the plates from being moved further apart. Thus, in order to prevent plates 151 and 152 from being pulled apart, some means is required for holding plate 152 substantially against plate 151 with a force greqter than the force of springs 158 urging the plates apart. As illustrated in FIG. 15 this means includes an air bladder or bellows 161 connected by an air hose 162 to a source of air pressure (not shown) and mounted between a plate 163 forming the bottom plate of the buckle 150 in the orientation shown in FIG. 15, and plate 164. Plate 164 includes a slotted opening 165 for recieving roller 157 and is mounted between bellows 161 and plate 152. Thus, when bellows 161 are inflated as shown in FIG. 15, plate 164 forces plate 152 into engagement with plate 151, and when slotted opening 159, 160 and 165 are in alignment, roller 157 will be in a position to prevent plates 151 and 152 from being pulled apart. However, when the pressure is released from bellows 161 and the bellows collapse as shown in FIG. 16, the force of springs 158 urges plate 152 away from plate 151 and permits plate 152 to be moved past roller 157 and pulled apart from plate 151. Thus, with this arrangement, air line 162 can be tied to the primary air lines applying pressure to the buoys so that whenever there is positive pressure in this line plate 151 and 152 will remain engaged. However, when pressure in the lines is shut off, such as when the buoy reaches sea bottom then plates 151 and 152 can be pulled apart and the buoy released from the pipeline. If desired, means (not shown) can be provided on the buoy which responds to a desired hydrostatic pressure, or to actual contact with the sea bottom, to cause the air supply to bellows 161 to be shut off and automatically release the buoy from the pipeline as it reaches a predetermined depth or sea bottom.

Of course, buckle 150 can be made fail safe by reversing the arrangement of the components so that bellows 161 must be pressurized to cause plate 152 to move away from plate 151, and when there is no pressure in bellows 161, the springs would urge plates 151 and 152 together.

Referring now to FIG. 17, another embodiment of the system and method of this invention is illustrated for supporting pipeline P at an angle in a body of water. In this embodiment a plurality of secondary buoys 14 are connected at spaced intervals to pipeline P, for example 50 feet apart. Each buoy 14 includes its associated control valve 25 to which a main air line 33 providing the main inflating pressure for buoys 14 is connected. Also a pilot pressure line 28 is provided which is connected to each of the control valves 25 and also includes a return line 28a. Means is also provided in flow line 28 for providing successively higher pilot pressure to each such buoy at successive lower, deeper depths of submergence. For example, a regulator 28b is connected in flow line 28 between each of the respective control valves as shown in FIG. 17. The full pilot pressure is supplied at the deepest end of the system, i.e., at the input of the lower most orifice 28b, and this pressure is dropped through each of the successive regulators 28b and returns to the surface through line 28a at a lower value than that in line 28. Thus, by proper sizing of each of the regulators 28b, a different pilot pressure can be provided for each of the control valves 25 for each buoy 14 corresponding to that required to cause each buoy to be stabilized at a desired depth. Thus, with this arrangement different pilot pressures can be supplied automatically to a large number of control valves by only two flow lines.

Figure 18:
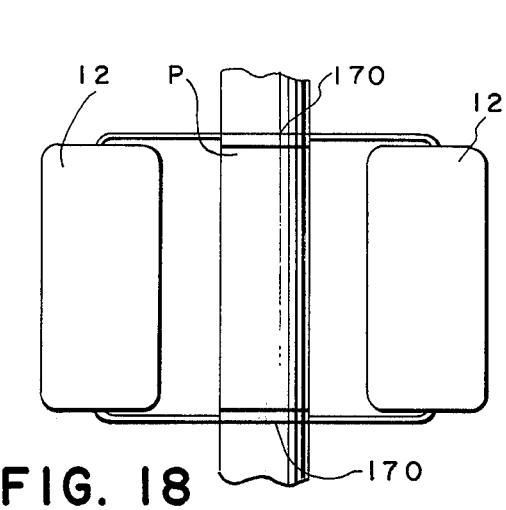
FIG. 18 is a side view in elevation of a system utilizing the buoyancy members of the present invention to control the ascent or descent of a vertical riser or other vertical member.
Figure 19:
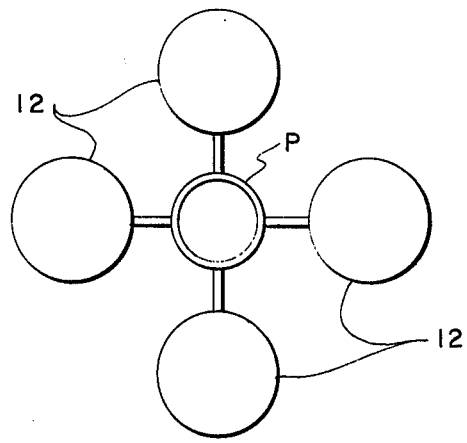
FIG. 19 illustrates a top view in elevation of the system of FIG. 18.

As illustrated in FIGS. 18 and 19, another embodiment of the present invention is directed to a system and method for holding a cylindrical object, such as a pipe, casing, or a riser vertically with respect to the ocean bottom. When drillships are drilling in water of over 1,000 feet in depth, the riser through which the well is drilled must be provided with a buoyancy system to withstand most of the weight of the pipe riser. The drillship is usually equipped with tensioners or other means for holding a part of the weight of this riser, but there is a depth at which the drill ship alone cannot restrain this weight (depending upon the individual drillship, and its equipment, and the diameter, wall thickness, and length of the particular riser). For instance, at 2,000 feet depth, the riser will usually weight about 300,000 lbs., and the average drillship is only equipped to restrain roughly one-third of this weight. In this type of application, the required number of buoys 12 would be spaced at intervals along the height of the riser, for example in groups of three about 100 feet of height apart, starting at the ocean floor. Clamps 170 are installed in a manner that the buoys will be fastened along the pipe at such intervals, with a single air or gas line extending along the entire length of the riser, with each floatation station taking its required air pressure from the line automatically in order to maintain its full inflation against the hydrostatic pressure at that depth, plus a slight differential pressure, inside each buoy. If a floating crane is used to lower the riser into the ocean, the buoys may be inflated or deflated as desired until the riser is in its position from ocean floor to drillship. If the length and weight is inconvenient for the crane to handle, then the buoys can be connected to self-inflate as the riser is lowered into the ocean, taking most of the load off the crane. Also, the entire length and weight of the riser can be handled on the surface by the buoyancy system alone, with the valving set up so as to lower the riser one end first into the ocean, with little or no help from a surface crane.

Figure 20:
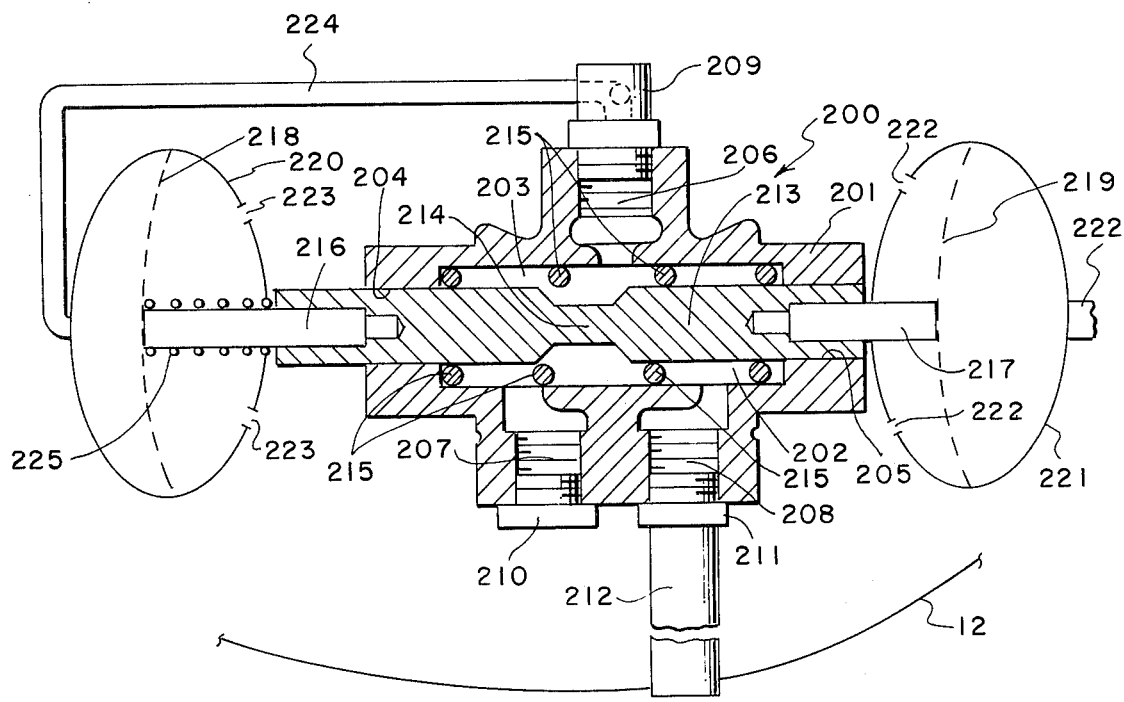
FIGS. 20 and 21 show another embodiment of the valve mechanisms of this invention.
Figure 21:
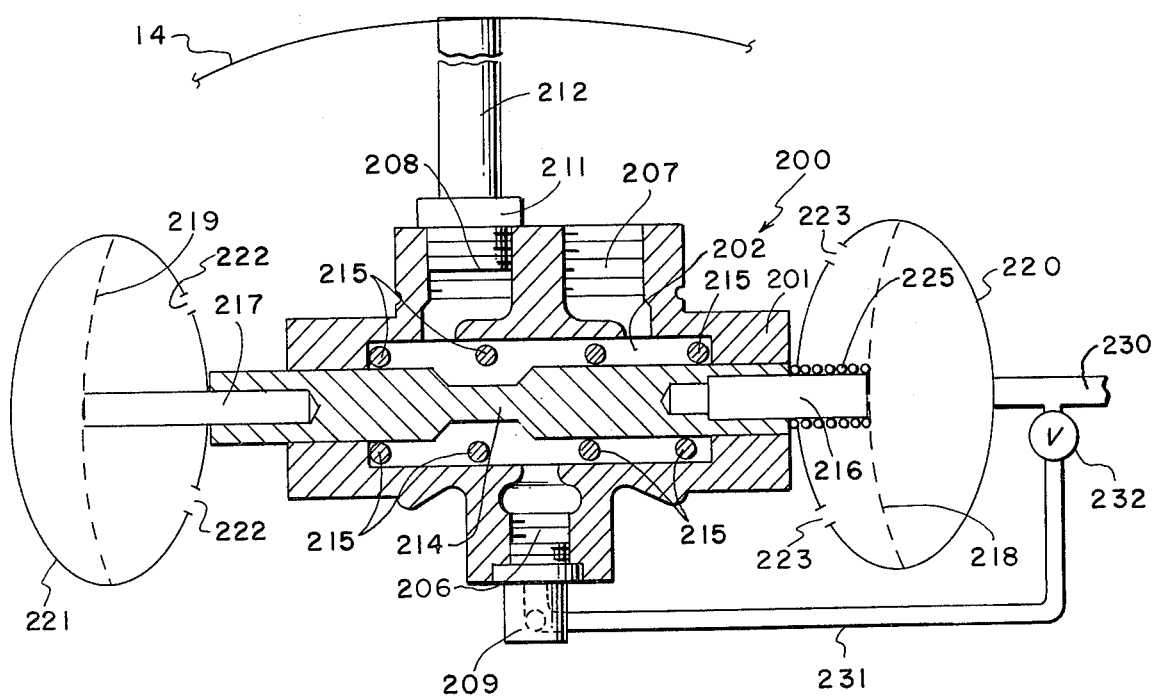

Referring now to FIGS. 20 and 21 in the drawings, an alternate form of the valving mechanism used for both the primary and secondary buoys of this invention is illustrated. As illustrated in FIG. 20 a suitable valve 200 for use with the primary buoys 12 includes a valve body or housing 201 having internal bore 202 pushing through the length of the valve body and including the central portion or chamber 203 of relatively larger diameter and end portions 204 and 205 of relatively smaller diameter. Valve body 201 also includes transverse bores 206 and 207 and 208 perpendicular to and communicating with bore 202. Bore 206 can be connected through a suitable fitting 209 to inlet 16 of a primary buoy 12 to conduct inflating pressure to the buoy. Bore 207 may be connected to flow line 19 through a suitable fitting 210 and bore 208 may be connected through a suitable fitting 211 to an exhaust conduit 212 for exhausting air or other inflating medium from buoy 12.

A slidable valve member 213 is mounted into bore 202 and includes a recessed center portion 214 smaller in diameter than the end portions of the valve member.

Suitable seals, such as O-rings 215 are provided about the valve member 213 and about the inner wall of chamber 203 to seal the inlet side of the valve from the exhaust site. Thus, with the arrangement shown when the center portion 214 of valve member 213 is to the left hand side of housing 201 as shown in FIG. 20, air is permitted to pass from bore 207 through chamber 203 into outlet bore 206. On the other hand, when center portion 214 of valve member 213 is to the right hand side of valve body 201, air is permitted to pass from bore 206 and out of exhaust outlet 212.

In order to automatically provide for the positioning of valve member 213 in the chamber 202 to provide the described operations at the appropriate time, one end of valve member 213 is connected through a threaded rod 216 to a flexible diaphram 218 mounted in a housing 220, and the other end of valve member 213 is connected through a threaded rod 217 to a flexible diaphram 219 mounted in a housing 221. As illustrated, housing 221 is open to the hydrostatic pressure on both sides of diaphragm 219 by openings 222 and one side (the side nearest valve body 201) of housing 220 is open to the hydrostatic pressure by openings 223. The opposite side of housing 220 is connected to a conduit 224 which conducts internal buoy pressure to the side of diaphram 218 opposite to the side exposed to the hydrostatic pressure. In addition, a coil spring 225 is mounted between diaphram 218 and valve member 213 so that a slightly higher buoy pressure will be required (for example 3 PSI in the spring is chosen to apply a 3 PSI force to diaphram 218) to cause the value to be balanced. Thus, until the buoy pressure exceeds the hydrostatic pressure by about 3 PSI (or other preselected small differential) then air will be added to the buoy. However, for example during ascent, if the buoy pressure exceeds the hydrostatic pressure by 3 PSI or greater, then air will be exhausted from the buoy through exhaust 212. If desired, the valve mechanism 200 can be mounted at the end of the buoy (assuming to be, for example, of an elongated cylindrical configuration), and exhaust pipe 212 can extend down to the bottom or below the bottom of the buoy so that the hydrostatic pressure at the end of the exhaust will be slightly greater (for example 1 PSI greater) than that about diaphrams 218 and 219 to ensure that the buoy will also maintain some residual pressure greater than the outside sea pressure and not be collapsed.

The valve mechanism 200 illustrated in FIG. 21 is identical to that illustrated in FIG. 20, except that it is mounted so that exhaust pipe 212 extends upwardly to the top (or slightly beyond) of a secondary buoy 14, and the side of housing 220 connected to receive buoy pressure in FIG. 20 is connected through a conduit 230 to receive air from a pilot air supply such as in conduit 28 in FIG. 1. With this arrangement the pressure in secondary buoy 14 can be varied by changing the pilot pressure. If desired, a flow line 231 can be connected between the fill inlet 16 of buoy 14 and conduit 230 through a check valve 232 normally closed by the pilot pressure so that when the pilot pressure is removed, the buoy pressure will hold pressure in the buoy to keep it from collapsing. Since it may be necessary to exhaust all air from the secondary buoys, the exhaust preferably extends upwardly as noted.

Other applications of the present invention are numerous, particularly in offshore oil and gas exploration and production, the laying of underwater cables, and handling heavy equipment or other objects in deep water. One embodiment would consist of lowering a "christmas tree" or other well-control equipment to the ocean floor. The floatation system could be left indefinitely attached to this equipment if desired, so at a later date the equipment could be brought to the surface again without the use of cranes, winches, etc. This would only require that an air line be left attached to the buoyancy system, with one end left at the surface attached to a surface buoy for any possible future operations. Another embodiment would apply to other underwater equipment, such as manned or unmanned craft, underwater cameras, and other tools the industry has needed to control remotely from the surface.

Also, many forms other than described of the control valves may be employed as long as the desired function is provided. Also, while it is preferred that the relatively small pressure differential between the buoy inflation pressure and the hydrostatic pressure be limited to a maximum 5 PSI to protect the buoy from rupture, if the inflating material can withstand a higher pressure, i.e., 20 PSI or more than, as long as such pressure is relatively small compared to the inflating pressure and the hydrostatic pressure the principles of this invention are being employed.

As many possible embodiments may be made of the invention without departing from the scope thereof, it is to be understood that all matter herein set forth or shown in the accompanying drawings is to be interpreted as illustrative and not in a limiting sense.

What is claimed is:

1. A submersible buoy for use in controlling the descent or ascent in an object in a body of water, comprising, in combination:
    an inflatable, collapsible buoy member including an inlet for receipt and discharge of an inflating medium, said buoy member capable of being inflated from a collapsed state of minimum buoyancy to a fully inflated state of maximum buoyancy,
    and valve means connected to said inlet and adapted to be connected to a source of inflating medium, said valve means being responsive to variations in the hydrostatic pressure about said buoy when submersed in a body of water to control the amount of inflation of said buoy member by the addition or removal of inflating medium in said buoy member in response to changes in the depth of submergence of said buoy member, while maintaining a relatively small pressure differential between the pressure of said inflating medium and said hydrostatic pressure throughout the depths of submergence of said buoy member in said body of water.

2. The buoy of claim 1 wherein said valve means includes a housing having an internal chamber and a valve member disposed in said chamber,
    a first port in said housing for providing fluid communication between said chamber and said inlet of said buoy member, a second port in said housing for providing fluid communication between said chamber and a source of fluid, and a third port in said housing for providing for the exhaust of fluid from said chamber,
    said valve member adapted to move to and from a first position in said chamber wherein fluid passes from said second port to and through said first port, a second position where fluid may pass from said first port to and through said third port, and a third position where fluid communication between said first, second, and third ports is blocked, and further including operator means connected to cause movement of said valve member between said first, second and third positions in response to the differential between the pressure of the fluid medium in said buoy member and the hydrostatic pressure in the body of water about said buoy member.

3. The submersible buoy of claim 2 wherein said operator means includes a DIAPHRAGM operatively connected to one end of said valve member to move said valve member between said positions, one side of said diaphram being exposed to the fluid pressure in said first port and the other side of said diaphram being exposed to the hydrostatic pressure of the surrounding body of water.

4. The submersible buoy of claim 2 wherein said valve member includes end portions of relatively large diameter and a center portion connecting the end portions of a relatively small diameter, and means for providing a relatively gradual reduction in diameter of said valve member between said end portions and said center portion to substantially reduce hysteresis during operation of the valve.

5. The submersible buoy of claim 3 further including spring means between said valve member and said housing for urging said valve member from said second position to said first position whereby the pressure of the inflating medium required to cause said valve to move to said third position exceeds the hydrostatic pressure about the buoy by an amount substantially equal to the pressure of said spring.

6. The submersible buoy of claim 2 wherein said operator means further includes a second DIAPHRAGM operatively connected to the end of said valve member opposite to the end to which said first mentioned DIAPHRAGM is connected, one side of said second DIAPHRAGM being exposed to the fluid pressure in said first port and the other side of said DIAPHRAGM being exposed to a pilot pressure which may be varied to vary the position of said valve member in said housing.

7. A buoyancy system for controlling the descent or ascent of an object in a body of water, comprising, in combination:
   a plurality of inflatable, collapsible, submersible buoys, each of said buoys having an inlet for receipt and discharge of an inflating medium, and being capable of being inflated from a collapsed state of minimum buoyancy to a fully inflated state of maximum buoyancy,
   a source of inflating medium for providing said inflating medium at pressure at least as high as the hydrostatic pressure in said body of water at the greatest depth of submersion of at least one of said submersible buoys; and
   a plurality of valve means each connected to the inlet of one of said buoys and to said source of inflating medium, each of said valve means being responsive to variations in the hydrostatic pressure about the buoy to which it is connected when it is submerged in said body of water to control the amount of inflation of said buoy by the addition or removal of inflating medium in said buoy in response to changes in the depth of submergence of said buoy, while maintaining a relatively small pressure differential between the pressure of said inflating medium and said hydrostatic pressure throughout the depths of submergence of said buoy in said body of water.

8. The system of claim 7 wherein a plurality of primary buoys and a plurality of secondary buoys are connected to control the ascent or descent of said object, and said primary buoys are provided by a plurality of fixed buoyancy members and said secondary buoys are provided by said inflatable buoys.

9. The buoyancy system of claim 7 wherein a plurality of primary buoys and a plurality of secondary buoys are provided by said inflatable buoys and are connected to control the ascent or descent of said object, said primary buoys being adapted to support the load of said object with a relatively small negative buoyancy, and the secondary buoys having a variable buoyancy to control the ascent and descent of said object in said body of water.

10. The buoyancy system of claim 7 wherein said object is a pipeline to be laid on the bottom of said body of water.

11. The buoyancy system of claim 10 wherein each of said buoys is mounted on said pipeline by a releasable braking mechanism whereby by actuation of said braking mechanism a buoy can ride the pipeline to a desired depth representing a position of neutral buoyancy in said body of water where the braking force can be released, and the pipeline can then pass through said braking mechanism while being supported thereby as it is lowered to sea bottom.

12. The buoyancy system of claim 10 further including a releasable buckle connected between each of said buoys and said pipeline, and means for causing said buckle to be disengaged to release said buoy from said pipeline upon command.

13. The buoyancy system of claim 10 wherein said pipeline descends at an angle in said body of water and the buoys are provided at spaced intervals along said pipeline, and wherein each of said valve means includes means responsive to a pilot pressure for varying the inflation of the buoy connected thereto, and further including a pilot pressure flow line for conducting the pilot pressure to each of said valve means and means in said flow line between each of said valve means to automatically provide a successively higher pilot pressure to the valve means connected to the buoys at greater depths in said body of water.

14. The buoyancy system of claim 13 wherein each of said means in said flow line is regulator means and wherein the valve means at the greatest depth receives the full pilot pressure from said flow line and the valve means at successively shallower depths receives successively lower pressure from said flow line.

15. The buoyancy system of claim 7 wherein said object is a riser connected between a drillship and sea bottom.

16. The buoyancy system of claim 10 wherein each of said buoys are connected to said pipeline by a remotely actuatable releasable buckle.

17. A method of supporting an object at various depths in a body of water comprising the steps of:
   supporting a major part of the load of said object with a plurality of inflatable, substantially completely collapsible, and relatively easily portable primary buoys submerged in said body of water, each of said buoys being inflatable so as to be substantially surrounded by only said body of water when submerged therein and utilizing a valve means responsive to variations in the hydrostatic pressure about said buoy when submerged in said body of water to automatically control the inflation of each of said buoys in response to the depth of submergence of said buoy during either ascent or descent of said buoys while maintaining a substantially constant relatively small pressure differential between the pressure of said inflating medium and the hydrostatic pressure at any selected depth in said body of water.

18. The method of claim 17 wherein the object to be supported is a pipeline to be laid offshore and said primary buoys are connected at spaced intervals along said pipeline.

19. The method of claim 17 wherein said primary buoys support said object in said body of water so that the combination of said buoys and said object have a relatively small negative buoyancy, and further including the steps of supporting the remaining load of said object with at least one inflatable secondary buoy having variable buoyancy and varying the inflation of said secondary buoy for controlling the volume of displacement of the buoy to control the descent and ascent of said object in said body of water.

20. The method of claim 19 wherein the object to be supported is a pipeline to be laid offshore and said primary and secondary buoys are connected at spaced intervals along said pipeline.

21. The method of claim 17 wherein the object to be supported is a pipeline to be laid offshore and wherein said pipeline is supported by said buoys under control at an angle of repose.

22. The method of claim 21 further including the step of releasably placing each of said buoys at spaced intervals along the length of said pipeline, selectively applying a braking force to cause selected ones of said buoys to ride the pipeline as it is lowered to a preselected depth at which the buoy can remain substantially static, and removing the braking force to cause the pipeline to pass through the braking apparatus of the buoy while being partially supported by the buoy.

23. The method of claim 21 wherein the buoyancy of each buoy is variable in response to a variable pilot pressure and further including the steps of spacing a plurality of said buoys along the length of said pipeline and providing a successively higher pilot pressure to each buoy at successively deeper depths of submergence.

24. The method of claim 23 wherein each of said buoys is connected to have its inflation varied by a common pilot pressure supply line connected between a source of pilot pressure and said buoys and further including the steps of conducting the full pilot pressure from said flow line to control the inflation of the lower most buoy, and successively restricting the flow in said flow line between successive buoys from the lower part of the pipeline towards the surface, and returning the flow line from the upper most buoy to the source of pilot pressure.

25. The method of claim 24 wherein the flow in said flow between adjacent buoys is controlled by a regulator means.

26. The method of claim 17 wherein each of said buoys is releasably connected to said object and further including the step of causing each buoy to be released upon command when the buoy is adjacent to the sea bottom.

27. A buoyancy system for aid in controlling the descent, ascent, and positioning of a vertical riser extending in a body of water from sea bottom to a drillship comprising, in combination:
a plurality of inflatable, collapsible, submersible buoys positioned at spaced intervals about said riser, each of said buoys having an inlet for receipt and discharge of an inflating medium, and being capable of being inflated from a collapsed state of minimum buoyancy to a fully inflated state of maximum buoyancy,
a source of inflating medium for providing said inflating medium at pressure at least as high as the hydrostatic pressure in said body of water at the greatest depth of submersion of at least one of said submersible buoys; and
a plurality of valve means each connected to the inlet of one of said buoys and to said source of inflating medium, each of said valve means being responsive to variations in the hydrostatic pressure about the buoy to which it is connected when it is submerged in said body of water to control the amount of inflation of the buoy by the addition or removal of inflating medium in said buoy in response to changes in the depth of submergence of said buoy, while maintaining a relatively small differential between the pressure of said inflating medium in said buoy and said hydrostatic pressure about the buoy throughout the depths of submergence of said buoy in said body of water.

28. A method of aiding in the control of the descent, ascent, and positioning of a vertical riser extending in a body of water from sea bottom to a drillship, comprising the steps of:
supporting a major part of the load of said object with a plurality of inflatable, substantially completely collapsible, and relatively easily portable buoys positioned at spaced intervals about said riser and submerged in said body of water, each of said buoys being inflatable so as to be substantially surrounded only by said body of water when submerged therein and
utilizing a valve means responsive to variations in the hydrostatic pressure about said buoy when submerged in said body of water to automatically control the inflation of each of said buoys in response to the depth of submergence of said buoy while maintaining a substantially constant relatively small pressure differential between the pressure of said inflating medium and the hydrostatic pressure at the depth of the respective buoy in said body of water.

* * * * *